United States Patent [19]

Claxton

[11] 3,777,463
[45] Dec. 11, 1973

[54] FRUIT-HARVESTING MACHINE AND CONVEYOR THEREFOR
[75] Inventor: Gerald L. Claxton, Lafayette, Calif.
[73] Assignee: Up-Right, Inc., Berkeley, Calif.
[22] Filed: Sept. 25, 1972
[21] Appl. No.: 292,083

[52] U.S. Cl. ................................................ 56/330
[51] Int. Cl. ............................................ A01g 19/00
[58] Field of Search ...................................... 56/330

[56] References Cited
UNITED STATES PATENTS
3,385,042 5/1968 Christie et al. ...................... 56/330
3,726,071 4/1973 Mecca ................................. 56/330

Primary Examiner—Louis G. Mancene
Assistant Examiner—J. A. Oliff
Attorney—Carlisle M. Moore et al.

[57] ABSTRACT

A harvesting machine having an endless belt conveyor for conveying the fruit harvested from plants wherein the fruit falling from the plants is directed to the upper side of the lower flight of the belt which extends lengthwise of the machine, parallel and very close to the ground. The belt carries the fruit and juice to one end of the machine. Spaced buckets mounted on the belt carry the fruit and juice upwardly to the top of the machine, wherein the belt tilts the buckets to dump the contents therefrom through a blast of air, for leaf removal, and onto a discharge conveyor. The belt returns then downwardly to the other end of the machine.

13 Claims, 5 Drawing Figures

PATENTED DEC 11 1973 3,777,463
SHEET 1 OF 2
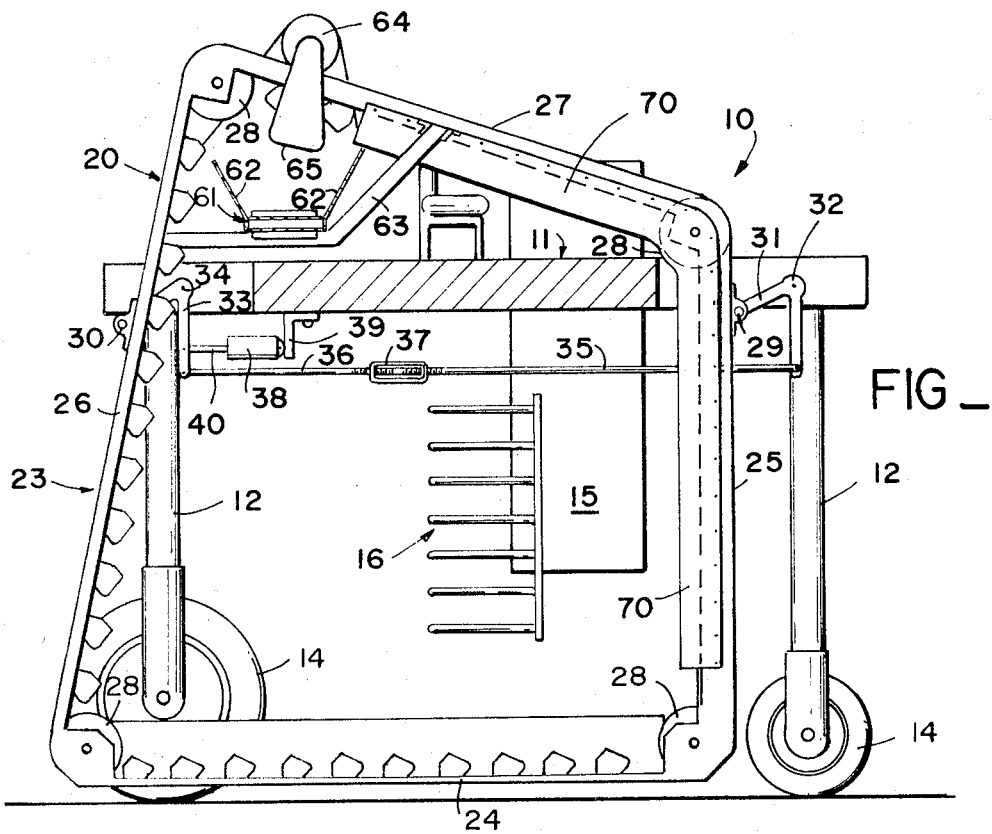
FIG_1
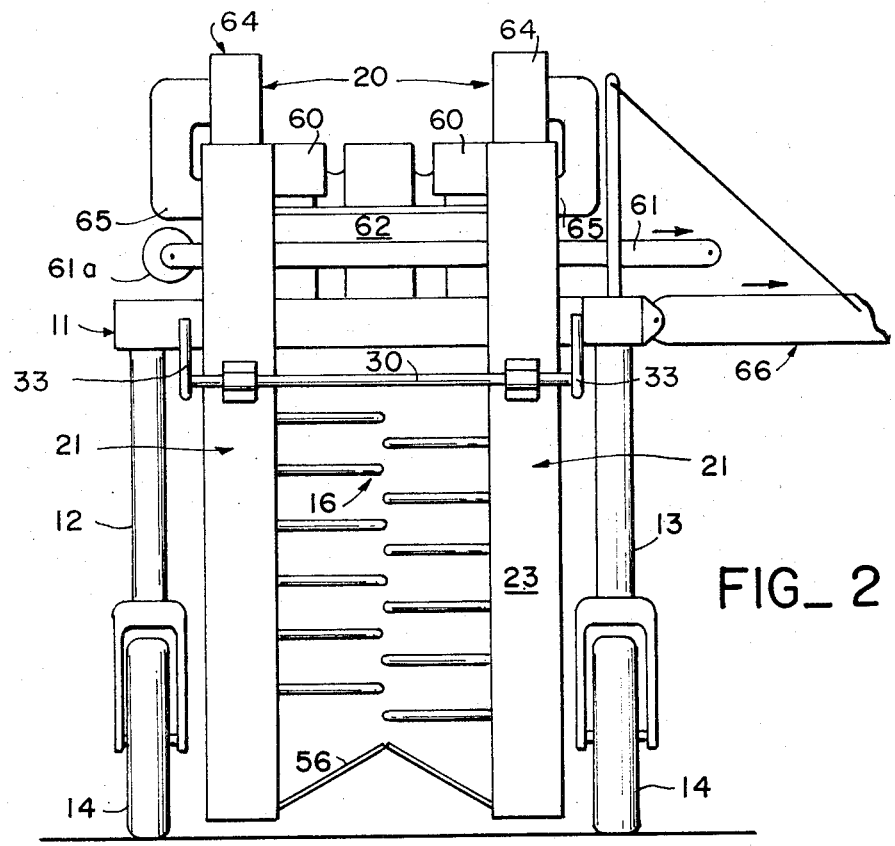
FIG_2

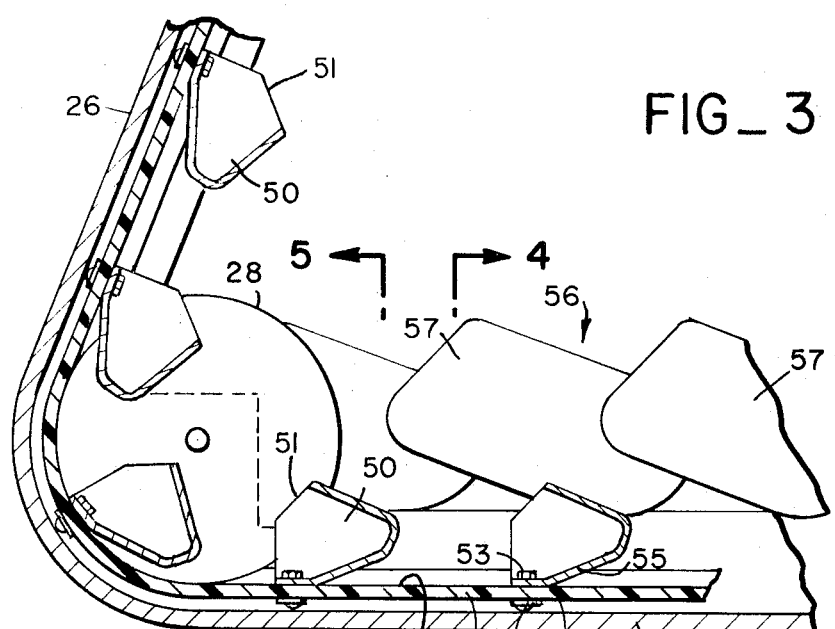
FIG_3
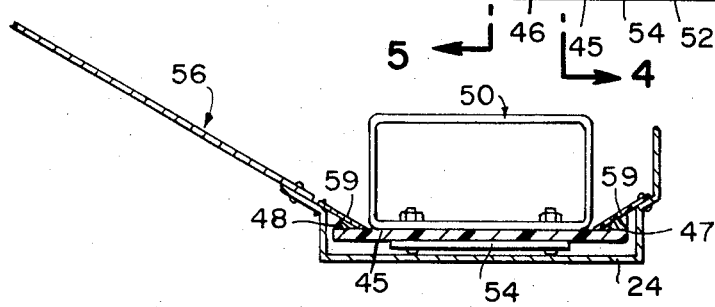
FIG_4
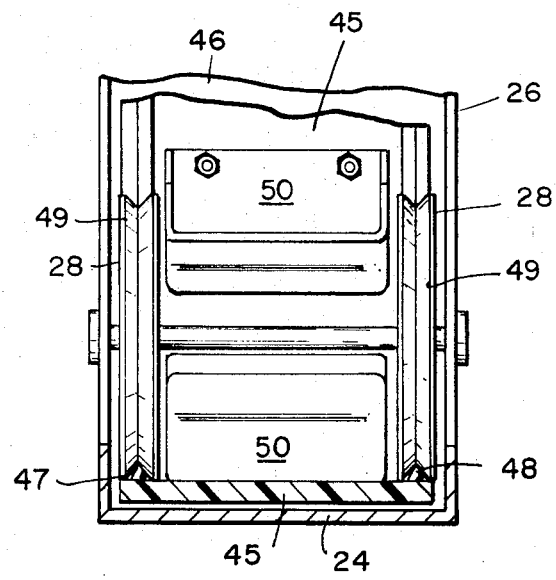
FIG_5

FRUIT-HARVESTING MACHINE AND CONVEYOR THEREFOR

BACKGROUND OF THE INVENTION

In the mechanical harvesting of fruit such as grapes or berries from rows of vines, various types of strikers, impactors or shakers are used to dislodge the fruit from the vines. In such mechanical harvesting a portion of the fruit is sufficiently brusied so as to cause juice. Additionally, a quantity of leaves are dislodged with the fruit. The mixture of fruit, juice and leaves falls onto inclined closure elements positioned below the vines and is deflected to conveyors on one or both sides of the row of vines, the mixture being then conveyed to a discharge point.

The conveyor means presently in use, such as typified in U.S. Pat. No. 3,601,965, have a significant disadvantage in that conventional conveyor construction requires the closure surfaces to be quite high above the ground, typically from 16 to 26 inches off the ground. In vineyards wherein the fruit is all above this height, the present harvesting machines are quite satisfactory. However, there is substantial acreage of vines wherein the fruit hangs down to only 10 or 12 inches from the ground. If such vines are harvested with present harvesters, the upper fruit will be harvested. However, the lower hanging fruit below the closures will fall to the ground and be wasted.

For example, with fins or "elephant ears" closures, one on each side of the vines, the closures must extend from the conveyors to the centerline of the row of vines to prevent the dislodged fruit from falling on the ground underneath the vines. These closures must slant at an angle, typically 15° to 20° outward and downward from the vine row centerline to deflect the falling grapes and juice to the conveyors. The slant of these deflecting closures requires a vertical distance of typically 5 inches. A conventional belt, ½ inch thick, requires 1 inch vertical space for both upper conveying and lower return flights. The drive pulleys must be a minimum of 4 inches in diameter. Typical 1-inch belt cleats add another 2 inches for both flights. Thus, the conventional closure and belt construction alone require 12 inches of vertical space.

In addition, a ground clearance must be provided between the ground and the bottom of the conveyor. In most vineyards the surface of the ground slopes from place to place. Previous conveyor devices for mechanical harvesters, being fixed on the machine at a certain height to clear the highest crown, berm or clods, have not been adjustable during the operation of the machine to catch fruit low under the vines while compensating for the slope of the ground. Vineyard rows are rarely planted on contour curves. Thus, on a variable side slope a conventional conveyor device has to be positioned high enough on the uphill side to clear the ground on he steepest slope. Typically about 6 inches of clearance is provided to compensate for variations in slope and to clear obstacles, and thereby avoid damage to the conveyor. Significant to the need for clearance for a conventional conveyor that runs rearwardly on the top is that the lower, or slack, cleated surface of the conveyor belt is running forward on the bottom, at a speed considerably faster than the ground speed of the harvesting machine. Without sufficient ground clearance the conveyor is easily damaged.

Further adding to the vertical space needed for the conventional under-vine conveyor is that the under-vine conveyor has to discharge onto some further conveyor, which must be positioned below the under-vine conveyor. The further conveyor will add at least another 6-inch vertical space requirement. Thus, for conventional harvesting machines a total of about 24 inches is required — 12 inches for the under-vine conveyor, 6 inches for ground clearance and 6 inches for the cross conveyor. As a consequence, such machines simply cannot harvest fruit which is only 10 to 12 inches off the ground.

SUMMARY OF THE INVENTION

In contrast to the previously used belt-type conveyors on harvesting machines, the present invention provides a belt conveyor wherein the fruit, juice and leaves are deflected by the inclined closure members onto the upwardly facing inside surface of the belt which is traveling parallel to the row of vines. At the rear of the machine the belt is curved into an upward path. As the belt curves upwardly, the fruit and juice slide from the inside belt surface into the spaced buckets lying on and secured to the inside of the belt, and are conveyed upwardly to the top of the machine. The belt is only ½ inch thick and therefore needs to slide in a thin metal pan or on rails ½ inch below the lower discharge end of the inclined closures. Only the smooth bottom of the pan, or of the belt if it is supported by spaced rails, is near the ground, so that less clearance is needed to prevent damage. Additionally, the amount of ground clearance can be easily adjusted by the operator during progress of the harvester so that the clearance can be maintained at a minimum. A ground clearance of from 2 to 4 inches can therefore be used. Thus, with a 5-inch vertical space for the closures, ½ inch belt thickness, ½ inch pan thickness and 2- to 4-inch ground clearance, the uppermost part of the closure will be from 8 to 10 inches above the ground, thereby making it possible to harvest fruit as low as 10 to 12 inches off the ground.

At the top of the machine the belt is curved again so that it goes from a vertical position to one wherein the inside belt surface faces downwardly, so that the fruit and juice is dumped from the buckets onto a conveyor. As the buckets are dumped the contents fall through a blower-created blast of air which removes the leaves from the mixture.

The belt is preferably formed with V-belts vulcanized to the inside surface of belt along each side. When the belt is in its horizontal position, with the inside facing up, the juice is confined by the V-belts to the flat spaces on the inside surface of the belt, between the buckets, so that no juice will be lost. In addition the V-belts are trained around V-grooved pulleys which both guide the belt and drive the belt by the frictional engage-ment of the V-belts in the grooves of the power-driven pulleys.

Other advantageous features of the invention will be pointed out in the following detailed description.

BRIEF DESCRIPTION OF THE DRAWINGS

In the drawings, forming a part of this application, and in which like parts are designed by like reference numerals throughout the same, FIG. 1 is a sectional view, in elevation of a harvesting maching embodying the present invention as viewed from the longitudinal centerline of the machine, and with the closure members being deleted from the drawing for purposes of illustration;

FIG. 2 is a rear elevational view of the machine of FIG. 1;

FIG. 3 is a sectional detail of a portion of the conveyor mechanism;

FIG. 4 is a sectional detail of the conveyor mechanism, taken on line 4—4 of FIG. 3;

FIG. 5 is a sectional detail of the conveyor mechanism, taken on line 5—5 of FIG. 3.

DESCRIPTION OF THE PREFERRED EMBODIMENT

The harvesting machine 10 comprises a frame 11 having a generally inverted-U configuration so that the machine can straddle a row of vines. The frame includes side portions 12 and 13 mounted on wheels 14 and which include the housings 15 containing the usual mechanism for actuating the striker members 16, the latter being used to dislodge the fruit from the vines.

A closure and conveying assembly, generally designated by the reference number 20, is mounted on the machine frame 11 between the side portions thereof and includes two conveyor mechanisms 21, one on each side of the longitudinal centerline of the machine. These conveyor mechanisms 21 are identical mirror images of each other, and the corresponding elements of these mechanisms are identified herein by the same reference numerals. As seen in FIG. 1, conveyor mechanism 21 includes an integral, four-sided frame 23 comprising a lower, shallow, open-topped pan 24 which extends the length of the machine and is generally parallel to the ground, front and rear generally vertical channel members 25 and 26 and an upper channel member 27. A pair of belt guide pulleys 28 are rotatably mounted at each corner of frame 23 for rotation about horizontal axes.

The front and rear channel members 25 and 26 of frame 23 are mounted on horizontal lifting rods 29 and 30 respectively. Rod 29 extends and is connected to one end of bell crank 31 which is pivotally mounted at its center 32 to frame 11. Similarly, rod 30 extends to and is connected to one end of bell crank 33, also pivoted at its center 34 to frame 11. Connecting rods 35 and 36, joined together by a turnbuckle 37, extend between the other ends of bell cranks 31 and 33. The turnbuckle enables the inclination of the conveyor assembly to be adjusted relative to the machine. A hydraulic cylinder 38, secured to bracket 39 on machine frame 11, has a ram 40 secured to bell crank 33. The hydraulic cylinder is connected to the hydraulic system of the machine and conventional controls, not shown, are provided so that the operator can introduce fluid under pressure into the cylinder, or bleed it therefrom, to adjust the position of ram 40. As is apparent, rearward movement of plunger 40 will rotate bell cranks 31 and 33 in unison to raise the conveyor mechanism 21 relative to the machine frame 11 and thus provide for adjustment of the clearance between the ground and the bottom of trough 24. Both conveyor mechanisms 21 are mounted on rods 29 and 30 so that the two conveyor mechanisms will move up or down as a unit.

An endless belt 45 is trained around the guide pulleys 28, the lower flight of the belt being disposed in and on the belt support pan 24 with the inside surface 46 of the belt facing upwardly. As best seen in FIGS. 3–5, belt 45 is imperforate and has smooth upper and lower surfaces. V-belts 47 and 48 are vulcanized to the inside surface of belt 45 along the full length of both sides thereof. Pulleys 28 have peripheral grooves 49 complementary to the shape of the V-belts 47 and 48.

A plurality of spaced buckets 50 are secured to the inside surface of belt 45 for movement therewith. Each bucket 50 has an open top 51 and lies on its side 52 on the belt so that the plane of the open top of the bucket is transverse and generally perpendicular to the belt, the bucket being secured to the belt by bolts 53 near the open top of the buckets. A retainer plate 54 is used on the underside of the belt to prevent the bolt heads from pulling through the belt. If desired, large washers could be used for this purpose. Side 52 of bucket 50 is inclined at 55 away from the belt so that the buckets do not interfere with the movement of the belt as it passes around pulleys 28, as shown in FIG. 3.

A closure member 56 is secured to the edge of pan 24 facing the centerline of the machine, the closure member extending the length of the pan and being inclined upwardly therefrom to the centerline of the machine. If desired, the closure member 56 may comprise a plurality of pivoted plates, or "elephant ears" 57 of the type shown in U.S. Pat. No. 3,126,692, or it may comprise a one-piece flexible member such as shown in U.S. Pat. No. 3,601,965. In any event, such closure member should be capable of deflecting around center posts upon which vines are supported.

If desired, thin resilient strips 59 may be secured to the sides of pan 24 along the length thereof to project down to the central surface 46 of the belt to guide juice onto the belt during the harvesting operation.

The upper rear pulleys 28 are powered by motor 60 to drive the belt 45 through its path. As belt 45 passes around those pulleys it changes direction so that the inside belt surface 46 faces downwardly to dump the contents of the bucket therefrom onto a collector which comprises a horizontal endless-belt cross-conveyor 61 having inclined collector panels 62 secured to the frame of the cross-conveyor and inclined upwardly therefrom. Cross-conveyor 61 is supported on frame members 63 extending between the rear and upper frame channels 26 and 27, and is powered by drive motor 61a. A blower 64 mounted on upper frame channel 27 has a suction 65 positioned to cause a volume of air to flow through the space between the belt 45 and cross-conveyor 61 so that leaves may be separated from the fruit and juice as they are dumped from the buckets 50 onto the cross-conveyor.

Cross-conveyor 61, which is mounted on the gathering and conveying assembly 20 for up-and-down movement therewith, and which collects grapes and juice from both conveyor mechanisms 21, discharges onto a further cross-conveyor 66 which is mounted at one end on the main frame 11 of the machine. Cross-conveyor 66 is utilized to convey the harvested grapes across the next row of vines to a receiving vehicle moving along that row at the same speed as the harvester.

Any juice which drips from the buckets after they have been dumped is caught by a fabric shroud 70, detachably secured to the upper and front channel members 27 and 25, the juice being returned to the lower flight of belt 45 in pan 24 for recycling. Thus, no juice is lost on the ground. This can result in substantial savings since raw juice of fine wine grapes is currently worth over 30 cents a pound.

In operation of the conveyor, the spaced buckets 50 on the lower flight of the belt in pan 24 act as conventional conveyor belt cleats and it is the inside belt surface 46 between the buckets which conveys the fruit horizontally to the rear of the machine. As a consequence, the belt surface 46 need only be approximately at the level of the lower end of the closures 56 rather than at a substantial depth therebelow, and the bodies of the buckets can project upwardly a substantial distance above the level of the lower end of the closures. It is only for vertical conveying that the buckets 50 are used as conveying devices. As the belt turns from its horizontal position to a vertical position, the buckets fill up with the fruit, juice and leaves. Broken canes from the vines have been conveyed rearwardly by the horizontal flight of the belt will be too long to fit within the buckets and will tumble downward therefrom to be swept out of the device and onto the ground by the other dangling canes on the vines. With a conventional system of under-vine belt conveyors and cross-conveyors, these broken canes are transferred along with the fruit and leaves into blowers or other places where they frequently clog the system.

The buckets 50 and pivoted closure members 57 are preferably made of a flexible plastic material so that if a closure member is deflected by a large ground object, e.g., a large vine trunk, end post or irrigation tile, and pivots into contact with a bucket, the closure member and bucket simply deflect and bend accordingly and then resume their normal slopes and functions after the object is passed. If it were not for this flexibility, it would be necessary for the closure member to pivot above the buckets, which in turn would increase the total height of the conveyor device.

Because the conveyor belts 45 convey the fruit on the inside of the belt, both horizontally and upwardly, a harvester machine of very compact width results. Conventional harvesters with belt conveyors must transfer the harvested fruit to cross-conveyor or cross chutes near the base of the machine, thereby substantially increasing its bottom width. A typical conventional belt conveyor harvester is from 10 to 12 feet wide. With the present conveyor system, the harvester can be as narrow as 7 feet, 8 inches. Therefore, the present harvester can harvest vine rows spaced as closely as 5 feet apart. In addition, the present machine is more maneuverable in a vineyard, at the end of the rows, than the conventional wider machines.

Having thus described my invention, I claim:

1. Harvesting apparatus comprising:
   a harvesting machine having a wheeled frame adapted to move longitudinally along a row of fruiting plants,
   a closure and conveying assembly mounted on the frame of said machine for movement with said machine along said row,
   said gathering and conveying assembly including a shallow open-topped belt support member extending longitudinally of said machine and generally parallel to the ground,
   closure means secured along one edge of said belt support member and extending upwardly and outwardly thereof,
   lower belt guide means mounted on said closure and conveying assembly at each end of said belt support member and upper belt guide means substantially above said belt support member,
   an endless belt trained around said belt guide means, said belt having its lower flight in and on said belt support member and extending the length thereof, the inner side of the lower flight of said belt facing upwardly and at a level approximately the same as the lower end of said closure means, said belt having portions extending upwardly from end of said belt support member to said upper belt guide means and an upper portion wherein said inner side faces downwardly,
   a plurality of open-top buckets spaced along and mounted on the inner side of said belt, said buckets being oriented to said belt with a side of each bucket lying on the belt with the plane of the open top of a bucket being transverse and generally perpendicular to said belt,
   means for driving said belt in a direction so that the buckets thereon will be moved upwardly with the open tops of the buckets facing upwardly,
   collector means mounted on said gathering and conveyor assembly below said upper belt portion for collecting fruit dumped from said buckets.

2. Apparatus as set forth in claim 1 and further including means for moving said closure and conveying assembly up and down relative to the frame of said harvesting machine.

3. Apparatus as set forth in claim 1, wherein said belt has ribs along the edges thereof which project away from the inner side of said belt, and wherein said upper and lower belt guide means comprise pairs of pulleys having peripheral grooves complementary to said belt ribs, said belt being trained around said pairs of pulleys with the belt ribs riding in said pulley grooves.

4. Apparatus as set forth in claim 1, wherein the side of each bucket which lies on the belt is secured to said belt adjacent the open top of the bucket, said side then sloping away from the inner side of said belt.

5. Apparatus as set forth in claim 1, wherein the bodies of said buckets extend upwardly from the lower flight of said belt a substantial distance above the level of the lower end of said closure means.

6. Apparatus as set forth in claim 1 and further including shroud means adjacent said belt and buckets thereon for collecting juice dripping from said belt and buckets, after dumping, and for delivering said juice back to the lower flight of said belt.

7. Apparatus as set forth in claim 1 wherein said collector means includes a generally horizontal endless belt conveyor.

8. Apparatus as set forth in claim 7 and further including blower means mounted on said closure and conveying assembly for generating a flow of air through the space between said collector means conveyor and the buckets thereabove.

9. Apparatus as set forth in claim 8 and further including a generally horizontal endless belt conveyor mounted on said harvesting machine and projecting outwardly therefrom, said harvesting machine-mounted conveyor being below said collector means conveyor to receive fruit discharged from the collector means conveyor, and further including means for moving said closure and conveyor assembly, and means mounted thereon, up and down relative to the frame of said harvesting machine.

10. Apparatus as set forth in claim 1 wherein said closure means comprises a plurality of plates pivotally mounted on said belt support member, wherein the bodies of said buckets extend upwardly from the lower end of said belt to above the level of the lower end of said plates and wherein said buckets are made of flexible plastic material.

11. Apparatus for harvesting fruit from a row of fruiting plants comprising:
a wheeled frame having side portions adapted to straddle said row of plants and move along said row,
means mounted on said frame between said side portions thereof for dislodging fruit from said plants,
a gathering and conveying assembly mounted on said frame between the side portions thereof,
said gathering and collecting means including a shallow open-topped belt support member on each side of the longitudinal centerline of the machine, each belt support member extending longitudinally of the machine and generally parallel to the ground,
closure means secured along the inner edge of each belt support member, the closure means on each belt support member extending upwardly and away from the belt support members and terminating in close adjacency with each other,
lower belt guide means mounted at both ends of each belt support member, and upper belt guide means associated with and substantially above each belt support member,
a first endless belt having the lower flight thereof disposed in and on one of said belt support members with the inner side of said belt facing upwardly and at a level approximately the same as the lower end of said closure means, said belt being trained around the belt guide means associated with said belt support member, said belt having portions extending upwardly from each end of said belt support member and an upper portion wherein said inner side of said belt faces downwardly,
a second endless belt on the other belt support member and trained around the belt guide means associated therewith and disposed similarly to said first endless belt,
a plurality of open-top buckets spaced along and mounted on the inner side of each belt, said buckets being oriented to a belt with a side of each bucket lying on the belt with the plane of the open top of the bucket being transverse and generally perpendicular to the belt,
means for driving said belts in a direction so that the buckets thereon will be moved upwardly with the open tops of the buckets facing upwardly,
collector means mounted on said gathering and conveyor assembly below said upper belt portions for collecting fruit dumped from said buckets.

12. Apparatus as set forth in claim 11 wherein said collector means includes a generally horizontal endless belt conveyor extending generally transverse of said frame and positioned below the upper portion of both the first and second endless belts.

13. Apparatus as set forth in claim 11 and further including means for moving said closure and conveying assembly up and down relative to said wheeled frame.

* * * * *